(12) United States Patent
Cho et al.

(10) Patent No.: US 8,023,897 B2
(45) Date of Patent: Sep. 20, 2011

(54) CONTROL SYSTEM AND METHOD IN A COMMUNICATION SYSTEM

(75) Inventors: Jae-Hee Cho, Seou (KR); Jeong-Ho Park, Seoul (KR); Kwan-Hee Roh, Hwaseong-si (KR); Tae-Young Kim, Seongnam-si (KR); Jin-Kyu Koo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1110 days.

(21) Appl. No.: 11/773,723

(22) Filed: Jul. 5, 2007

(65) Prior Publication Data

US 2008/0008113 A1    Jan. 10, 2008

(30) Foreign Application Priority Data

Jul. 4, 2006 (KR) .................. 10-2006-0062491

(51) Int. Cl.
*H04B 1/00* (2006.01)

(52) U.S. Cl. ......... 455/63.1; 455/10; 455/119; 455/222; 455/278.1; 455/283; 455/296; 455/522; 455/422.1; 455/418; 455/419

(58) Field of Classification Search ............... 455/67.11, 455/423, 115.2, 424, 420, 425, 242, 252, 455/79, 522, 422.1, 418, 419, 63.1, 10, 119, 455/222, 278.1, 283, 296
See application file for complete search history.

(56) References Cited

U.S. PATENT DOCUMENTS

| 6,961,362 | B2 | 11/2005 | Ariyoshi et al. | |
|---|---|---|---|---|
| 2001/0053670 | A1 | 12/2001 | Voyer | |
| 2004/0092233 | A1 | 5/2004 | Rudrapatna | |
| 2005/0186983 | A1* | 8/2005 | Iochi | 455/522 |
| 2005/0197161 | A1* | 9/2005 | Uehara et al. | 455/561 |
| 2005/0282562 | A1 | 12/2005 | Lee et al. | |
| 2006/0019694 | A1* | 1/2006 | Sutivong et al. | 455/522 |
| 2006/0068825 | A1* | 3/2006 | Iochi | 455/522 |

FOREIGN PATENT DOCUMENTS

| EP | 1 653 762 | 5/2006 |
|---|---|---|
| GB | 2 407 454 | 4/2005 |
| WO | WO 2005/101888 | 10/2005 |

* cited by examiner

*Primary Examiner* — Kwasi Karikari
(74) *Attorney, Agent, or Firm* — The Farrell Law Firm, P.C.

(57) ABSTRACT

In a control method of a communication system, a Base Station (BS) receives noise and interference information from at least one neighboring BS in charge of a neighboring cell being adjacent to a serving cell of the BS, calculates a control value of Mobile Stations (MSs) located in the serving cell according to the received noise and interference information, and generates control information according to the calculated control value, and transmits the generated control information to the MSs.

34 Claims, 5 Drawing Sheets

CONTROL SYSTEM AND METHOD IN A COMMUNICATION SYSTEM

PRIORITY

This application claims the benefit under 35 U.S.C. §119 (a) of a Korean patent application filed in the Korean Intellectual Property Office on Jul. 4, 2006 and assigned Serial No. 2006-62491, the contents of which are incorporated herein by reference.

BACKGROUND OF THE INVENTION

1. Field of the Invention

The present invention relates generally to a communication system, and in particular, to a method and system for controlling an uplink in a communication system.

2. Description of the Related Art

Extensive research on the next generation communication system is being conducted to provide users with high-speed services having various Quality of Service (QoS) levels. Particularly, to increase data transmission capacity and improve QoS, the communication system controls transmission power in a downlink and an uplink such that a Base Station (BS) or a Mobile Station (MS) can have a Signal-to-Interference and Noise Ratio (SINR) necessary for data reception with minimum signal strength. By controlling transmission power in this manner, the communication system allows an MS having a low SINR to have higher transmission power in a service area where it can receive a communication service from the BS, thereby stably exchanging data with the BS. By doing so, the communication system improves QoS and prevents the MS from transmitting signals with unnecessarily high power, thereby reducing QoS degradation of an MS that uses the same frequency band and receives a communication service from a neighboring BS.

This power control scheme controls transmission power of a transmitter such that when a receiver receives a transmission signal transmitted by a BS or an MS, the receiver can maintain its required SINR. In particular, a communication system employing Orthogonal Frequency Division Multiplexing (OFDM)/Orthogonal Frequency Division Multiple Access (OFDMA) increases, as described above, the transmission power of signals within the area where no interference occurs between neighboring BSs, such as where the data being exchanged between neighboring BSs and MSs that receive communication services from the neighboring BSs does not act as an interference signal, thereby improving QoS of received signals. Therefore, the communication system needs to apply different power control conditions to an MS that has a high channel quality (i.e., an MS that is located in the center area of a BS in charge of a particular cell), and another MS that has a low channel quality (i.e., an MS that is located in the boundary area of the BS).

For example, when an MS located in the boundary area of the BS increases transmission power of its transmission signals for data exchange with the BS in charge of the cell where it is located, the MS induces an interference signal which is higher in strength by the transmission power, to a neighboring BS in charge of a cell neighboring the cell where it is currently located. Therefore, the BS allows the receiver, or the MS, to transmit signals with the minimum transmission power needed to maintain an SINR required for data exchange. However, when an MS located in the center area of the BS increases transmission power of its transmission signals, interference signals being applied to the neighboring BS in charge of a cell neighboring the cell where it is currently located are lower in strength. Therefore, the BS allows the MS to transmit signals with higher transmission power to improve reception quality, i.e., QoS, of transmission/reception signals. Accordingly, a scheme is needed for controlling transmission power for data exchange in the communication system in the foregoing manner.

In addition, the BS can reduce a Packet Error Rate (PER) of transmission/reception data by allowing the MS located in the center area of its own cell to transmit signals with higher transmission power, thereby reducing retransmission of packets due to reception failure of data and thus preventing waste of resources. By reducing the retransmission of packets, the BS can allocate the remaining resources to the MSs having a low channel quality and increase packet retransmission of the MSs having a low channel quality over the allocated channels, thereby improving performance of the communication system. Therefore, a scheme is needed for controlling transmission power in the communication system in the foregoing manner.

SUMMARY OF THE INVENTION

An aspect of the present invention is to address at least the problems and/or disadvantages and to provide at least the advantages described below. Accordingly, an aspect of the present invention is to provide a control method and system in a communication system.

Another aspect of the present invention is to provide a method and system for controlling power of an uplink in a communication system.

According to the present invention, there is provided a control method in a communication system. The control method includes receiving, by a BS, noise and interference information from at least one neighboring BS in charge of a neighboring cell being adjacent to a serving cell of the BS, calculating a control value of MSs located in the serving cell according to the received noise and interference information, and generating control information according to the calculated control value, and transmitting the generated control information to the MSs.

According to the present invention, there is provided a control method in a communication system. The control method includes receiving, by a BS, noise and interference information between neighboring BSs and MSs and calculating a control value of the MSs according to the received noise and interference information.

According to the present invention, there is provided a control system in a communication system. The control system includes a BS for receiving noise and interference information from at least one neighboring BS in charge of a neighboring cell being adjacent to a serving cell of the BS, calculating a control value of MSs located in the serving cell according to the received noise and interference information, generating control information according to the calculated control value and transmitting the generated control information to the MSs.

According to the present invention, there is provided a control system in a communication system. The control system includes a BS for receiving noise and interference information between neighboring BSs and MSs and calculating a control value of the MSs according to the received noise and interference information.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
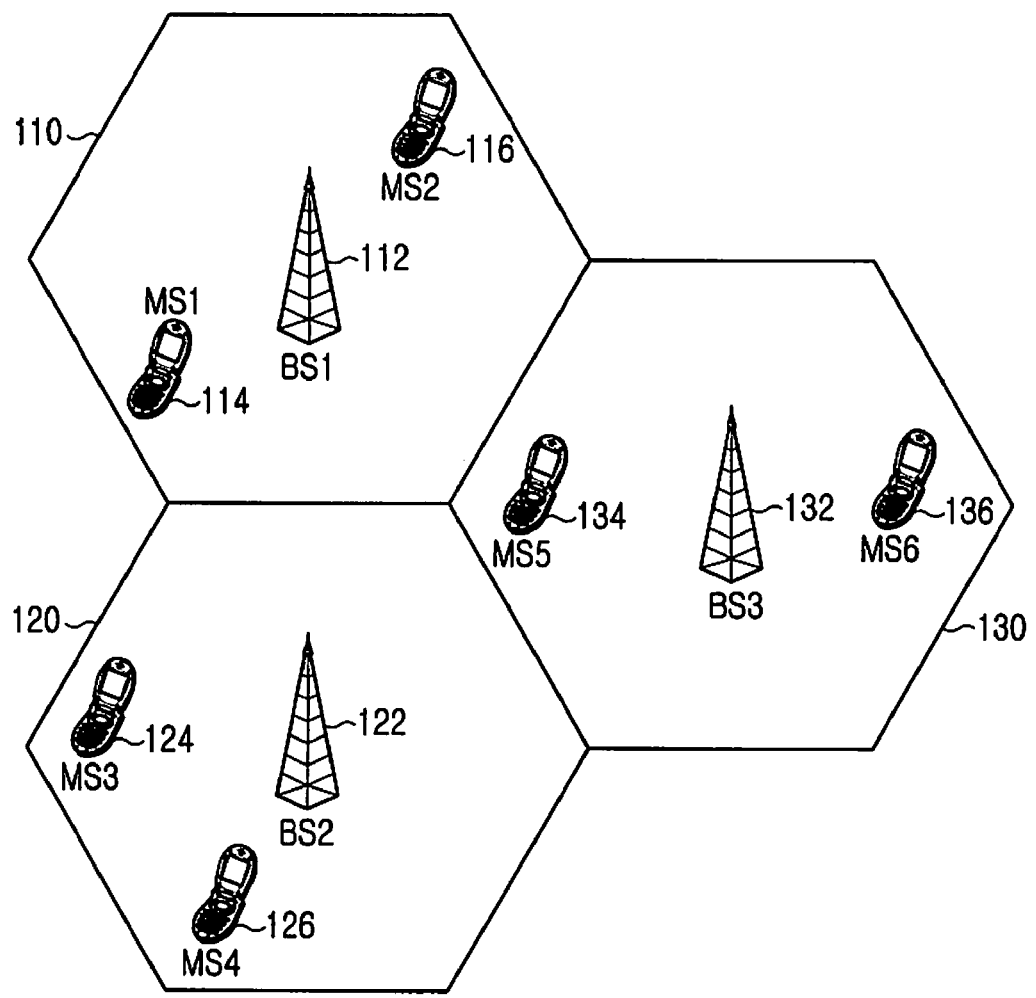
FIG. 1 illustrates a configuration of a communication system according to the present invention.

Preferred embodiments of the present invention will now be described in detail with reference to the annexed drawings. In the following description, a detailed description of known functions and configurations incorporated herein has been omitted for the sake of clarity and conciseness.

The present invention provides a control method and system in a communication system, for example, an Institute of Electrical and Electronics Engineers (IEEE) 802.16 communication system, which is a Broadband Wireless Access (BWA) communication system. Although preferred embodiments of the present invention will be described herein with reference to an IEEE 802.16 communication system employing Orthogonal Frequency Division Multiplexing (OFDM)/Orthogonal Frequency Division Multiple Access (OFDMA), by way of example, the control method and system provided by the present invention can also be applied to other communication systems.

In addition, the preferred embodiments of the present invention provide a method and system for controlling power when a communication system exchanges data between a Base Station (BS) in charge of a serving cell and a Mobile Station (MS) that is located in the cell and receives a communication service from the BS. The preferred embodiments of the present invention, described below, provide a method and system for controlling transmission power when a communication system employing OFDM/OFDMA performs uplink transmission, i.e., when an MS receiving a communication service from a BS in charge of a serving cell transmits data to the BS.

Further, the preferred embodiments of the present invention provide a method and system for controlling power of an uplink in a communication system. Also provided are a method and system in which a BS (i.e. serving BS) in charge of a serving cell controls transmission power of an MS in an OFDM/OFDMA communication system. The serving BS, when an arbitrary MS located in a serving cell of the serving BS itself transmits signals in the uplink, controls transmission power of the MS according to Noise and Interference level (NI) information indicating a level of noise and interference of neighboring BSs in charge of neighboring cells being adjacent to the serving cell, and channel information corresponding to a channel quality between an arbitrary MS located in the serving cell and neighboring BSs, for example, propagation path loss information or Channel Quality Information (CQI). Although preferred embodiments of the present invention will be described herein for when a serving BS generates power control information according to NI information of neighboring BSs, and channel information between MSs located in a serving cell and neighboring BSs, for example, propagation path loss information, and transmits the power control information to the MSs, the present invention can also be applied to when the serving BS generates not only the power control information but also control information such as Modulation and Coding Scheme (MCS), resource allocation and offset information at reference power, and transmits the generated information to the MSs.

The 'NI information' as used herein refers to NI information for noise and interference caused by the signals from which the signal that a serving BS receives from an arbitrary MS located in a serving cell is excluded, for example, caused by the signals that MSs located in neighboring cells have transmitted to the corresponding neighboring BSs. That is, upon receipt of signals from the MSs located in the serving cell, the serving BS measures NI that affects the serving BS by the signals from which the signals received from the MSs are excluded, and transmits the measured NI information to the corresponding neighboring BSs via a backbone network. In this case, the serving BS exchanges its own NI information and the NI information of the neighboring BSs with the neighboring BSs via the backbone network. For the NI measurement, the serving BS measures a level of signals from which the signals received from the MSs located in the serving cell are excluded, i.e. level of noise and interference, or measures the level using, for example, a pilot. The serving BS transmits NI information corresponding to the measurement result to the corresponding neighboring BSs via the backbone network.

The 'channel information' as used herein refers to the information corresponding to a channel quality between the neighboring BSs and an MS located in the serving cell. The neighboring BSs or the MS measure a channel quality, such as propagation path loss, Received Signal Strength Indication (RSSI), Signal-to-Interference and Noise Ratio (SINR) or Carrier-to-Interference and Noise Ratio (CINR) between the neighboring BSs and the MS, and transmit the measured channel information to the serving BS. When the neighboring BSs measure a channel quality between the neighboring BSs and the MS located in the serving cell, the channel information is transmitted to the serving BS via the backbone network, and when the MS measures a channel quality between the MS and the neighboring BSs, the channel information is transmitted to the serving BS over an uplink between the serving BS and the MS.

FIG. 1 illustrates a configuration of a communication system according to the present invention.

Referring to FIG. 1, the communication system has a multi-cell configuration, i.e. has a cell #1 110, a cell #2 120 and a cell #3 130 that are controlled by a BS1 112, a BS2 122 and a BS3 132, respectively. An MS1 114 and an MS2 116 are located in the cell #1 110 and receive a communication service from the BS1 112, an MS3 124 and an MS4 126 are located in the cell #2 120 and receive a communication service from the BS2 122, and an MS5 134 and an MS6 136 are located in the cell #3 130 and receive a communication service from the BS3 132. Each MS has both mobility and fixability. For convenience, it will be assumed herein that the MS1 114, MS3 124 and MS5 134 are located far from their BSs, i.e. BS1 112, BS2 122 and BS3 132, i.e. located in boundary areas of the cell #1 110, cell #2 120 and cell #3 130; and the MS2 116, MS4 126 and MS6 136 are located close to their BSs, i.e. BS1 112, BS2 122 and BS3 132, i.e. located in center areas of the cell #1 110, cell #2 120 and cell #3 130. In addition, it will be assumed that the BS1 112 is greater in NI than the other BSs 122 and 132, and the BS3 132 is less in NI than the other BSs 112 and 122. Further, signal exchange between the BSs 112, 122 and 132, and the MSs 114, 116, 124, 126, 134 and 136 located in the cells 110, 120 and 130 is assumed to be achieved using OFDM/OFDMA.

The MS1 114, MS3 124 and MS5 134, as they are located in the boundary areas of the cell #1 110, cell #2 120 and cell #3 130 as described above, transmit signals to the corresponding BSs with higher transmission power compared to the other MSs, for example, the MS2 116, MS4 126 and MS6 136; and the MS2 116, MS4 126 and MS6 136, as they are located in the center areas of the cell #1 110, cell #2 120 and cell #3 130, transmit signals to the corresponding BSs with lower transmission power compared to MS1 114, MS3 124 and MS5 134. The signals transmitted by the MSs 114, 116, 124, 126, 134 and 136 serve as noise and interference signals to neighboring BSs. Particularly, the signals transmitted by the MSs 114, 124 and 134 located in the boundary areas of the cells serve as high-level noise and interference to the neighboring BSs. Therefore, the BSs 112, 122 and 132 control transmission power of the MSs 114, 116, 124, 126, 134 and 136 located in the serving cells.

The BSs 112, 122 and 132 each control transmission power of the MSs 114, 116, 124, 126, 134 and 136 using NI information of neighboring BSs and channel information between the neighboring BSs and the MSs 114, 116, 124, 126, 134 and 136 located in the serving cells, received via a backbone network from the neighboring BSs or the MSs 114, 116, 124, 126, 134 and 136 located in the serving cells. For example, the BS1 112 for the cell #1 110 receives NI information of neighboring BSs, i.e. BS2 122 and BS3 132, via the backbone network, and receives CQI between the neighboring BSs, i.e. BS2 122 and BS3 132, and the MSs, i.e. MS1 114 and MS2 116, located in the cell #1110. The BS1 112 receives CQI between the neighboring BSs and the MSs 114 and 116 located in the cell #1 110 from the neighboring BSs, i.e. BS2 122 and BS3 132, via the backbone network, or receives the CQI from the MSs, i.e. MS1 114 and MS2 116, over the uplink. In addition, the BS1 112 measures a level of signals from which the signals received from the MSs, i.e. MS1 114 and MS2 116, located in the cell #1 110 are excluded, i.e. a level of noise and interference, or measures NI.

Upon receipt of the NI information of the neighboring BSs and channel information between the neighboring BSs and the MSs located in the serving cell, the serving BS controls transmission power of the MSs located in the serving cell. For convenience, it will be assumed herein that the serving BS controls transmission power of an $m^{th}$ MS located in the serving cell among multiple MSs located in the serving cell and neighboring cells, using, for example, propagation path loss as the channel information between the neighboring BSs and the MSs located in the serving cell. The transmission power of the MSs located in the serving cell, controlled by the serving BS, can be expressed as Equation (1).

$$P_{UL,m} = L_m + CINR_{req,m} + NI_{UL} + 10\log_{10}(BW_m) + Offset_{BS,m} \leq P_{UL\text{-}MAX,m} \quad (1)$$

In Equation (1), $P_{UL,m}$ denotes transmission power of an $m^{th}$ MS located in the serving cell, determined by the serving BS, i.e. transmission power of an MS in an uplink, and $P_{UL\text{-}MAX,m}$ denotes maximum transmission power available by the $m^{th}$ MS. That is, the transmission power $P_{UL,m}$ of the $m^{th}$ MS, determined by the serving BS, cannot exceed the maximum transmission power $P_{UL\text{-}MAX,m}$ of the $m^{th}$ MS. In addition, $L_m$ denotes propagation path loss, i.e. channel information, between the serving BS and the $m^{th}$ MS, and $CINR_{req,m}$ denotes a reception CINR required by the serving BS to receive the data transmitted by the $m^{th}$ MS at an MCS level. That is, $CINR_{req,m}$ is a required reception CINR of the serving BS in the uplink, used for satisfying a predetermined Packet Error Rate (PER) when the serving BS receives the data from the $m^{th}$ MS, and the serving BS can control $CINR_{req,m}$ by controlling an MCS level for the transmission data of the $m^{th}$ MS.

Further, $NI_{UL}$ denotes NI of the serving BS, included in its NI information measured by the serving BS, and $BW_m$ denotes a frequency band allocated to the $m^{th}$ MS through scheduling, i.e. denotes resources that the serving BS has allocated to the $m^{th}$ MS to exchange data with the $m^{th}$ MS. $Offset_{BS,m}$ denotes an offset from reference transmission power of the $m^{th}$ MS, determined by the serving BS. For example, when $Offset_{BS,m}$ is a positive value, the $m^{th}$ MS increases (UP) its transmission power to improve the reception CINR of the serving BS, and when the predetermined PER remains below a required reception CINR, the serving BS sets $Offset_{BS,m}$ to a negative value to allow the $m^{th}$ MS to decrease (DOWN) its transmission power, thereby reducing interference to a neighboring cell by the $m^{th}$ MS.

As shown in Equation (1), the transmission power $P_{UL,m}$ of the $m^{th}$ MS, determined by the serving BS, is determined depending on channel information such as propagation path loss $L_m$, between the serving BS and the $m^{th}$ MS, MCS information applied for data transmission by the $m^{th}$ MS such as required reception CINR $CINR_{req,m}$ of the serving BS, NI information $NI_{UL}$ of the serving BS, resources, i.e. frequency band $BW_m$, allocated to the $m^{th}$ MS, and an offset $Offset_{BS,m}$ from reference transmission power.

Power control schemes used in the communication system can be classified into an open-loop and a closed-loop power control scheme according to whether a transmitter, or a BS, periodically transmits power control information to a receiver, or an MS. The open-loop power control scheme controls power using the NI information and offset, frequency band, and required CINR, in other words, MCS information, transmitted by the BS, and propagation path loss information measured and generated by the MS. However, the closed-loop power control scheme generates a transmission signal to the BS using NI information and offset, frequency band, and required CINR, in other words, MCS information, transmitted by the BS, and propagation path loss information measured and generated by the BS, i.e. generates the transmission signal according to the frequency band and the MCS information, and controls power of the transmission signal according to the NI information and offset, and a propagation path loss variation included in reception CINR.

More specifically, in the communication system employing the open-loop power control scheme, the serving BS transmits, to the $m^{th}$ MS, MCS information applied for data transmission by the $m^{th}$ MS in Equation (1), for example, required reception CINR $CINR_{req,m}$ of the serving BS, NI information $NI_{UL}$ of the serving BS, resources, i.e. frequency band $BW_m$, allocated to the $m^{th}$ MS, and offset $Offset_{BS,m}$ from the reference transmission power. The $m^{th}$ MS measures a channel quality between the $m^{th}$ MS and the serving BS, for example, measures propagation path loss $L_{DL,m}$ of the downlink. Then the $m^{th}$ MS, as it recognizes the parameters in Equation (1), determines transmission power $P_{UL,m}$ of the uplink using Equation (1). Thereafter, the $m^{th}$ MS determines transmission power for when it transmits signals to the serving BS using the open-loop power control scheme, as shown in Equation (2).

$$P_{UL,m\text{-}OL} = P_{UL,m} + Offset_{MS,m} \leq P_{UL\text{-}MAX<m} \quad (2)$$

In Equation (2), $P_{UL,m\text{-}OL}$ denotes transmission power of an $m^{th}$ MS, determined using the open-loop power control scheme, $P_{UL,m}$ denotes transmission power of the $m^{th}$ MS, determined by Equation (1), and $Offset_{MS,m}$ denotes offset from transmission power of the $m^{th}$ MS, determined by Equation (1), i.e. offset from the reference transmission power.

In the communication system employing the closed-loop power control scheme, the serving BS transmits, to the $m^{th}$ MS, MCS information applied for data transmission of the $m^{th}$ MS in Equation (1), for example, required reception CINR $CINR_{req,m}$ of the serving BS, and resource, i.e. frequency band $BW_m$, allocated to the $m^{th}$ MS. Thereafter, the serving BS calculates a transmission power variation of the $m^{th}$ MS as shown in Equation (3).

$$\Delta P = CINR_{req,m} - CINR_{RX,m} \quad (3)$$

In Equation (3), $\Delta P$ denotes a transmission power variation of the $m^{th}$ MS, $CINR_{req,m}$ denotes a reception CINR required by the serving BS to receive data transmitted by the $m^{th}$ MS at an MCS level, and $CINR_{RX,m}$ denotes a reception CINR of the data last received from the $m^{th}$ MS and indicates a reception CINR of the serving BS when the $m^{th}$ MS transmits data to the serving BS with transmission power $P_{UL,m-old}$ determined by the serving BS using Equation (1).

In this manner, the serving BS calculates the transmission power variation $\Delta P$ of the $m^{th}$ MS and transmits it to the $m^{th}$ MS, and the $m^{th}$ MS determines transmission power as shown in Equation (4).

$$P_{UL,m-CL} = P_{UL,m-old} + \Delta P + Offset_{MS,m} \leq P_{UL,MAXM,m} \quad (4)$$

In Equation (4), $P_{UL,m-CL}$ denotes transmission power of the $m^{th}$ MS, determined using the closed-loop power control scheme, and $P_{UL,m-old}$ denotes transmission power of the $m^{th}$ MS, determined by the serving BS as shown in Equation (1), and indicates transmission power used during the last data transmission to the serving BS by $m^{th}$ MS. Further, $\Delta P$ denotes a transmission power variation of the $m^{th}$ MS, calculated by Equation (3), and $Offset_{MS,m}$ denotes offset from transmission power of the MS, determined by Equation (1), i.e. offset from reference transmission power.

In the communication system according to the present invention, for power control, a transmitter or serving BS not only receives NI information of neighboring BSs from the neighboring BSs, but also measures NI of the serving BS, and transmits its own NI information corresponding to the measured NI to the corresponding neighboring BSs. The serving BS generates CQI by measuring a channel quality of an uplink between MSs located in the neighboring cells, for example, generates propagation path loss information by measuring propagation path loss, and transmits the generated information to the neighboring BSs, and receives propagation path loss information between the neighboring BSs and the MSs from the neighboring BSs or the MSs located in the serving cell. Thereafter, the serving BS calculates a control value for each of the MSs according to the received NI information and propagation path loss information, and transmits power control information including the calculated control value to the MSs, thereby controlling power of the MSs. In particular, in the present invention as described below, the serving BS does not broadcast the NI information received from the neighboring BSs to the MSs, and the serving BS can control MCS, resource allocation and offset of each MS by controlling power of the MSs.

Figure 2:
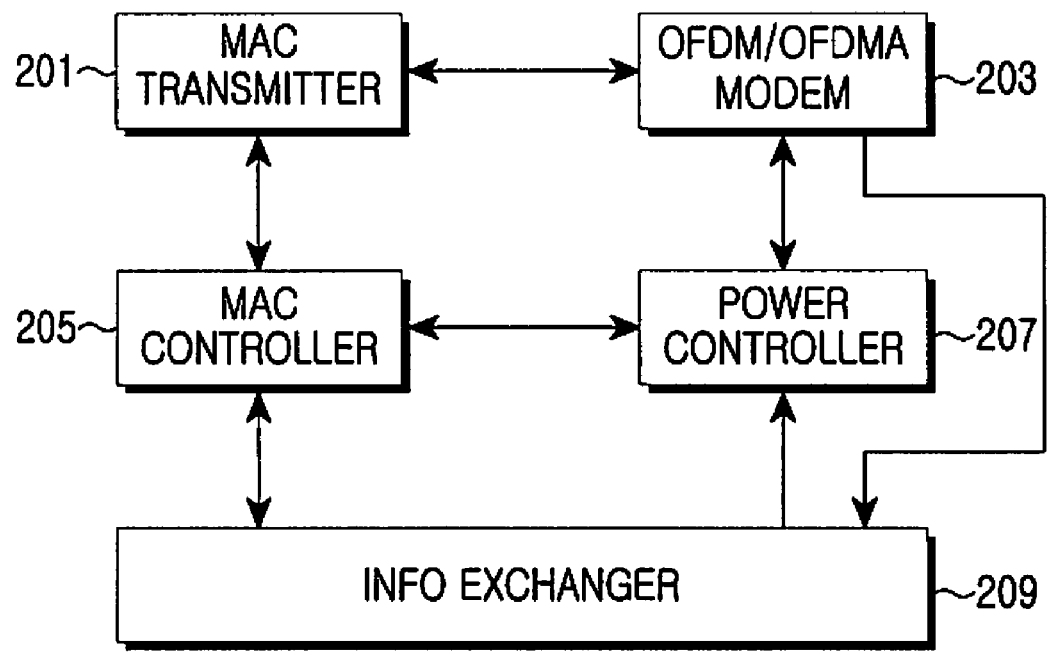
FIG. 2 illustrates a structure of a BS for power control in a communication system according to the present invention.

FIG. 2 illustrates a structure of a BS for power control in a communication system according to the present invention.

Referring to FIG. 2, the BS includes a Medium Access Control (MAC) transmitter 201, an OFDM/OFDMA modem 203, a MAC controller 205, a power controller 207 and an information exchanger 209.

The MAC transmitter 201 generates a MAC Protocol Data Unit (MAC PDU) by exchanging transmission data with an upper layer and the OFDM/OFDMA modem 203. That is, the MAC transmitter 201 receives data packets transmitted from the upper layer and control packets from the MAC controller 205, generates a MAC PDU using the received packets and transmits the MAC PDU to the OFDM/OFDMA modem 203. Further, the MAC transmitter 201 separates a payload part from the MAC PDU generated and transmitted by the OFDM/OFDMA modem 203, for an OFDM signal received from each MS, and transmits a data packet to the upper layer and a control packet to the MAC controller 205.

The MAC controller 205 manages system information such as downlink transmission power for signal transmission from the BS to the MSs located in the serving cell, uplink transmission power acquired from the MSs and downlink and uplink resource structure of the BS. The MAC controller 205 determines an appropriate MCS level by performing scheduling on the data to be transmitted in the uplink and downlink, and allocates a frequency band as resources, for example, physical layer resources, to be used for data transmission/reception via the OFDM/OFDMA modem 203. After performing the scheduling, the MAC controller 205 generates allocation information in the uplink and downlink, and transmits the generated allocation information and the system information of the BS to neighboring BSs via the information exchanger 209.

Further, the MAC controller 205 receives system and allocation information of the neighboring BSs via the information exchanger 209, and manages the received system and allocation information of the neighboring BSs, together with its own system and allocation information. The system and allocation information are transmitted to the OFDM/OFDMA modem 203, which uses the system and allocation information in generating an OFDM signal and measuring NI, propagation path loss and reception CINR $CINR_{RX}$ in Equation (3). In addition, the MAC controller 205 generates as a MAC message a power control message transmitted from the power controller 207, for example, a power control message including open-loop power control scheme or closed-loop power control scheme information, and transmits the MAC message to the MAC transmitter 201, which transmits the generated MAC message to the OFDM/OFDMA modem 203 to transmit the power control scheme information to the MSs. If the OFDM/OFDMA modem 203 receives, from the MS, downlink propagation path loss information between the MS and the neighboring BS, the MAC controller 205 receives the received propagation path loss information via the MAC transmitter 201 and manages the received propagation path loss information. The propagation path loss information is transmitted to the power controller 207 where it is used for generating a transmission control value of the MSs. A detailed description of a process of generating a transmission control value of the MS using the propagation path loss information received from the MS will be made hereinbelow.

The information exchanger 209 exchanges the information necessary for power control, for example, system, resource allocation and NI information, with neighboring BSs via a backbone network. More specifically, the information exchanger 209 receives system and allocation information of the BS from the MAC controller 205, and receives, from the OFDM/OFDMA modem 203, NI information of the BS, measured and generated by the OFDM/OFDMA modem 203, and propagation path loss information between an MS located in a neighboring cell and the BS. The information exchanger 209 transmits the received information to neighboring BSs via the backbone network, and receives system and allocation information of the neighboring BSs, NI information of the neighboring BSs, and propagation path loss information between the neighboring BSs and MSs located in the serving cell, from the neighboring BSs via the backbone network. The system and allocation information of the neighboring BSs, received at the information exchanger 209, are transmitted to the MAC controller 205, and the NI information of the neighboring BSs and the propagation path loss information between the neighboring BSs and the MSs located in the serving cell are transmitted to the power controller 207.

The OFDM/OFDMA modem 203 generates an OFDM signal using MAC PDU and allocation information received from the MAC transmitter 201 and the MAC controller 205, and then transmits the OFDM signal to each MS. The OFDM/OFDMA modem 203 generates a MAC PDU from an OFDM signal received from each MS and transmits the generated MAC PDU to the MAC transmitter 201. Further, the OFDM/OFDMA modem 203 measures NI of the BS, and transmits NI information of the BS corresponding to the measurement result to the power controller 207 and the information exchanger 209. In addition, the OFDM/OFDMA modem 203 measures a propagation path loss between the BS and the MSs located in the neighboring cell, and transmits propagation path loss information corresponding to the measurement result to the power controller 207 and the information exchanger 209. The OFDM/OFDMA modem 203, operating as a receiver of the neighboring BS, measures the propagation path loss between the BS and the MSs located in the neighboring cell using system and allocation information of the neighboring BSs, received from the MAC controller 205 via the MAC transmitter 201. The measurement of the propagation path loss is possible by measuring RSSI, SINR and CINR of the signals received from the MSs located in the neighboring cell. The OFDM/OFDMA modem 203 measures a reception CINR $CINR_{RX}$ for the uplink signals received from the MSs included in the serving cell according to the system and allocation information received from the MAC controller 205, and transmits the measured $CINR_{RX}$ to the power controller 207.

The power controller 207 controls power of the MSs using the open-loop or the closed-loop power control scheme. In this case, the power controller 207 controls power of the MSs located in the serving cell according to NI information of the neighboring BS, received from the information exchanger 209, propagation path loss information received from the OFDM/OFDMA modem 203 or the information exchanger 209, and $CINR_{RX}$ received from the OFDM/OFDMA modem 203. A detailed description will now be made of an operation of the OFDM/OFDMA modem 203 and the power controller 207, i.e. a power control operation of the BS according to the present invention.

For the OFDM/OFDMA modem 203, when the MSs located in the neighboring cell transmit signals to the corresponding BSs, the transmitted signals serve as noise and interference signals to the serving BS, and after measuring NI based on the noise and interference signal, the OFDM/OFDMA modem 203 transmits the NI information of the BS corresponding to the measurement result to the information exchanger 209 and the power controller 207. The measurement of the NI is conducted using pilot signals transmitted by the MSs located in the neighboring cell, and the OFDM/OFDMA modem 203 transmits the NI information of the BS corresponding to the measurement result to the information exchanger 209, which transmits the NI information to the neighboring BSs via the backbone network. The OFDM/OFDMA modem 203, operating as a receiver of the neighboring BS, measures a propagation path loss between the BS and the MSs located in the neighboring cell using the system and allocation information of the neighboring BSs, received from the MAC controller 205, and transmits the propagation path loss information corresponding to the measurement result to the information exchanger 209 and the power controller 207. Further, the OFDM/OFDMA modem 203 measures a reception CINR $CINR_{RX}$ for the uplink signals received from the MSs located in the serving cell using the system and allocation information of the BS, received from the MAC controller 205, and transmits the measured $CINR_{RX}$ to the power controller 207. As for the measured $CINR_{RX}$, upon receipt of data from the MSs located in the serving cell, the OFDM/OFDMA modem 203 measures $CINR_{RX}$ for the last received data using Equation (3), and then transmits the measured $CINR_{RX}$ to the power controller 207. The $CINR_{RX}$ has been described in detail in Equation (3).

The power controller 207 receives NI information of the neighboring BS that the information exchanger 209 has transmitted after receiving it from the neighboring BSs via the backbone network, propagation path loss information received from the OFDM/OFDMA modem 203 or the information exchanger 209, NI information and $CINR_{RX}$ of the BS, measured and transmitted by the OFDM/OFDMA modem 203, system information and allocation information received from the MAC controller 205, such as MCS information of the MSs, i.e. $CINR_{req,m}$ required by the BS to receive data, to which an MCS level is applied, from the MSs as described in Equation (1), and an offset $Offset_{BS,m}$ from reference transmission power for the MSs, and resource allocation information, such as frequency band information of the MSs.

The power controller 207 generates power control information of the MSs by calculating a control value of uplink transmission power for the MSs as shown in Equation (1) using the information received from the OFDM/OFDMA modem 203, the MAC controller 205 and the information exchanger 209. The transmission power of the MSs shown in Equation (1) can be shown in Equation (5) depending on power control of the power controller 207 of the BS in the communication system according to the present invention. That is, Equation (1) can be shown as Equation (5), and similarly to the description of Equation (1), a description of Equation (5) will be made for one MS, i.e. an $m^{th}$ MS, located in the serving cell among multiple MSs.

$$P_{UL,m} = P_{UL,m\text{-}old} + \Delta_{UL,m} = L_m + CINR_{req,m} + NI_{UL} + 10\log_{10}(BW_m) + Offset_{BS,m} \leq P_{UL\text{-}MAX,m} \quad (5)$$

In Equation (5), $P_{UL,m}$ denotes transmission power of an $m^{th}$ MS located in a serving cell, determined by the serving BS, and $P_{UL\text{-}MAX,m}$ denotes maximum transmission power available by the $m^{th}$ MS. That is, the transmission power $P_{UL,m}$ of the $m^{th}$ MS, determined by the serving BS, cannot exceed the maximum transmission power of the $m^{th}$ MS. $P_{UL,m\text{-}old}$ denotes transmission power of the $m^{th}$ MS, determined and transmitted by the serving BS using Equation (3) and Equation (4), and indicates the last transmission power of the $m^{th}$ MS, and $\Delta_{UL,m}$ denotes a control value of the $m^{th}$ MS. The control value $\Delta_{UL,m}$ of the $m^{th}$ MS will be described in detail hereinbelow. The $P_{UL,m\text{-}old}$ is stored and managed in the information exchanger 209, the MAC controller 205 or the power controller 207. $L_m$, $CINR_{req,m}$, $NI_{UL}$, $BW_m$, and $Offset_{BS,m}$ in Equation (5) have been described in detail with reference to Equation (1).

In Equation (5), the serving BS calculates a control value $\Delta_{UL,m}$ using NI information $NI_{UL}$ of the neighboring BS, that the information exchanger 209 has received from the neighboring BS via the backbone network, and propagation path loss information $L_{m-n}$ between the $m^{th}$ MS and the neighboring BSs, received from the OFDM/OFDMA modem 203 or the information exchanger 209. After calculating the control value $\Delta_{UL,m}$, the BS determines a required reception CINR $CINR_{req,m}$ satisfying Equation (5), i.e. satisfying a transmission power variation corresponding to a control value $\Delta_{UL,m}$ from the previous transmission power $P_{UL,m-old}$, i.e. determines an MCS level to be applied for data transmission by the $m^{th}$ MS, resource, or frequency band $BW_m$, to be allocated to the $m^{th}$ MS, and an offset $Offset_{BS,m}$ from the reference transmission power, generates power control information of the MSs so as to determine transmission power $P_{UL,m}$ of the $m^{th}$ MS according to the determined $CINR_{req,m}$, $BW_m$ and $Offset_{BS,m}$ using the open-loop power control scheme or the closed-loop power control scheme, and then transmits the generated power control information to the MSs. After the BS generates power control information of each MS for all MSs located in the serving cell in an arbitrary order, if the power control information is generated for all MSs, the BS transmits the power control information to all MSs. Although the description has been made herein as to the generation of the power control information satisfying Equation (5), by way of example, the BS can also control information such as MCS information, resource allocation information and offset information, and transmit the generated information to the MSs.

A description will now be made of an operation in which the BS calculates a control value $\Delta_{UL,m}$ using NI information $NI_{UL}$ of the neighboring BS, that the information exchanger 209 has received from the neighboring BS via the backbone network, for the $m^{th}$ MS, and propagation path loss $L_{m-n}$ between neighboring BSs and the MS, received from the OFDM/OFDMA modem 203, or received from the neighboring BS via the information exchanger 209.

Because there are multiple neighboring BSs and there are also multiple MSs located in the serving cell and the neighboring cell, the serving BS receives NI information of the neighboring BSs, received from the multiple neighboring BSs, and propagation path loss information received from the multiple neighboring BSs or the $m^{th}$ MS located in the serving cell. That is, the serving BS has multiple NI values and multiple propagation path loss values. Therefore, the serving BS calculates a control value $\Delta_{UL,m}$ of the $m^{th}$ MS as shown in Equation (6), and calculates a control value $\Delta_{UL}$ for all MSs located in the serving cell.

$$\Delta_{UL,m} = f(NI_{UL}, L_{m-n}) \quad (6)$$

In Equation (6), the control value $\Delta_{UL,m}$ of the $m^{th}$ MS is determined depending on NI information $NI_{UL}$ of the neighboring BS, and propagation path loss information $L_{m-n}$ between the neighboring BS and the $m^{th}$ MS, received from the neighboring BS or the $m^{th}$ MS. A detailed description thereof will be made hereinbelow.

When there are multiple neighboring BSs for which $NI_{UL}$ of neighboring BSs is greater than a reference NI $NI_{UL-ref}$ set by the system or user according to communication environment depending on NI information of the neighboring BS, received from the neighboring BSs, the BS transmits signals to MSs causing substantial noise and interference to the neighboring BSs with $NI>NI_{UL-ref}$, i.e. first-group neighboring BSs, with high transmission power so that a control value $\Delta_{UL,m}$ of the $m^{th}$ MS that has a low propagation path loss $L_{m-n\_1}$ and causes substantial noise and interference to the neighboring BSs, i.e. having a propagation path loss less than a reference propagation path loss $L_{ref}$ set by the system or the user according to the communication environment has a negative value $-\Delta_{DN}$. An absolute value of the control value $\Delta_{UL,m}$ for the $m^{th}$ MS having the low propagation path loss $L_{m-n\_1}$ is proportional to an absolute value of a difference between $NI_{UL}$ of the neighboring BSs and the reference $NI_{UL-ref}$ and is inversely proportional to the low propagation path loss $L_{m-n\_1}$.

When there are multiple neighboring BSs having an $NI_{UL}$ that is less than the reference NI $NI_{UL-ref}$, the BS transmits signals to MSs causing less noise and interference to the neighboring BSs with $NI<NI_{UL-ref}$, i.e. second-group neighboring BSs, with low transmission power so that a control value $\Delta_{UL,m}$ of the $m^{th}$ MS that has a high propagation path loss $L_{m-n\_2}$ and gives less noise and interference to the neighboring BSs, i.e. having a propagation path loss greater than the reference propagation path loss $L_{ref}$ has a positive value $\Delta_{UP}$. An absolute value of the control value $\Delta_{UL,m}$ for the $m^{th}$ MS having the high propagation path loss $L_{m-n\_2}$ is proportional to an absolute value of a difference between $NI_{UL}$ of the neighboring BSs and the reference $NI_{UL-ref}$ and is inversely proportional to the high propagation path loss $L_{m-n\_2}$.

When there are multiple neighboring BSs having an $NI_{UL}$ that is less than the reference NI $NI_{UL-ref}$, the BS transmits signals to MSs causing less noise and interference to the neighboring BSs with $NI>NI_{UL-ref}$, i.e. third-group neighboring BSs, with low transmission power so that a control value $\Delta_{UL,m}$ of the $m^{th}$ MS that has a high propagation path loss $L_{m-n\_3}$ and causes less noise and interference to the neighboring BSs, i.e. that has a propagation path loss greater than the reference propagation path loss $L_{ref}$, has a positive value $\Delta_{UP}$. An absolute value of the control value $\Delta_{UL,m}$ for the $m^{th}$ MS having the high propagation path loss $L_{m-n\_3}$ is inversely proportional to an absolute value of a difference between $NI_{UL}$ of the neighboring BSs and the reference $NI_{UL-ref}$ and is proportional to the high propagation path loss $L_{m-n\_3}$.

The control value $\Delta_{UL,m}$ of the $m^{th}$ MS, determined taking the foregoing relationship into account, can be expressed as Equation (7).

$$\begin{aligned} w_{m-n} &= -Step_{DN} \text{ if } NI_{UL} - NI_{UL-ref} > 0 \text{ and } L_{m-n} < L_{ref} \\ &= Step_{UP} \text{ if } NI_{UL} - NI_{UL-ref} < 0 \text{ and } L_{m-n} > L_{ref} \\ &= 0 \text{ otherwise} \end{aligned} \quad (7)$$

In Equation (7), $w_m$ denotes a control value $\Delta_{UL,m}$ of the $m^{th}$ MS for when one arbitrary BS among multiple neighboring BSs is considered, and for $w_{m-n}$ of Equation (7), the control value $\Delta_{UL,m}$ of the $m^{th}$ MS, determined considering all of N neighboring BSs, can be expressed as Equation (8).

$$e_m = \sum_{n=0}^{N-1} w_{m-n} \quad (8)$$

In Equation (8), $e_m$ denotes a control value $\Delta_{UL,m}$ of the $m^{th}$ MS for when N neighboring BSs are considered, and for $e_m$ of Equation (8), the control value $\Delta_{UL,m}$ of the $m^{th}$ MS, determined considering a lower threshold $DN_{TH}$ and an upper threshold $UP_{TH}$ set by the system or the user according to the communication environment, can be expressed as Equation (9).

$$\begin{aligned} \Delta_{UL,m} &= -\Delta_{DN} \text{ if } e_m < DN_{TH} \\ &= \Delta_{UP} \text{ if } e_m > UP_{TH} \\ &= 0 \text{ otherwise} \end{aligned} \quad (9)$$

In Equation (9), $\Delta_{DN}$ and $\Delta_{UP}$ denote a variation in the control value $\Delta_{UL,m}$.

If the control value $\Delta_{UL,m}$ of the $m^{th}$ MS is calculated as shown in Equation (6), the BS determines $CINR_{req,m}$, $BW_m$ and $Offset_{BS,m}$ satisfying Equation (5) according to the calculated control value $\Delta_{UL,m}$, and generates power control information for controlling transmission power of the $m^{th}$ MS, using the open-loop or the closed-loop power control scheme. The BS generates power control information of all MSs located in the serving cell in a manner of generating power control information for controlling transmission power of the $m^{th}$ MS, and then transmits the generated power control information to all MSs located in the serving cell. A detailed description will now be made of a preferred operation in which the BS determines $CINR_{req,m}$, $BW_m$ and $Offset_{BS,m}$ satisfying Equation (5) according to the calculated control value $\Delta_{UL,m}$, and then generates power control information for controlling transmission power $P_{UL,m}$ of the $m^{th}$ MS.

For example, when the control value $\Delta_{UL,m}$ calculated using Equation (6) is 3 dB, if NI information $NI_{UL}$, $L_m$ and $BW_m$ of the serving BS that has last determined the transmission power $P_{UL,m\text{-}old}$ are identical, the BS generates power control information so as to control $P_{UL,m}$ satisfying Equation (5) by adjusting $CINR_{req,m}$ and $Offset_{BS,m}$, which are now undergoing scheduling. More specifically, if $CINR_{req,m}$ by an MCS level at the $P_{UL,m\text{-}old}$ is 10 dB and $CINR_{req,m}$ by the target MCS level is 8 dB, the BS can satisfy the required control value $\Delta_{UL,m}$ of −3 dB by setting $Offset_{BS,m}$ to −1 dB. Therefore, the BS generates power control information for controlling transmission power $P_{UL,m}$ of the $m^{th}$ MS according to $CINR_{req,m}$, $BW_m$ and $Offset_{BS,m}$ satisfying the control value $\Delta_{UL,m}$ in Equation (5), using the open-loop or the closed-loop power control scheme, and then transmits the generated power control information to the MSs.

Although the description has been made herein as to the generation of the power control information satisfying Equation (5), by way of example, the BS can also generate control information such as MCS, resource allocation and offset information, and transmit the generated information to the MSs.

Figure 3:
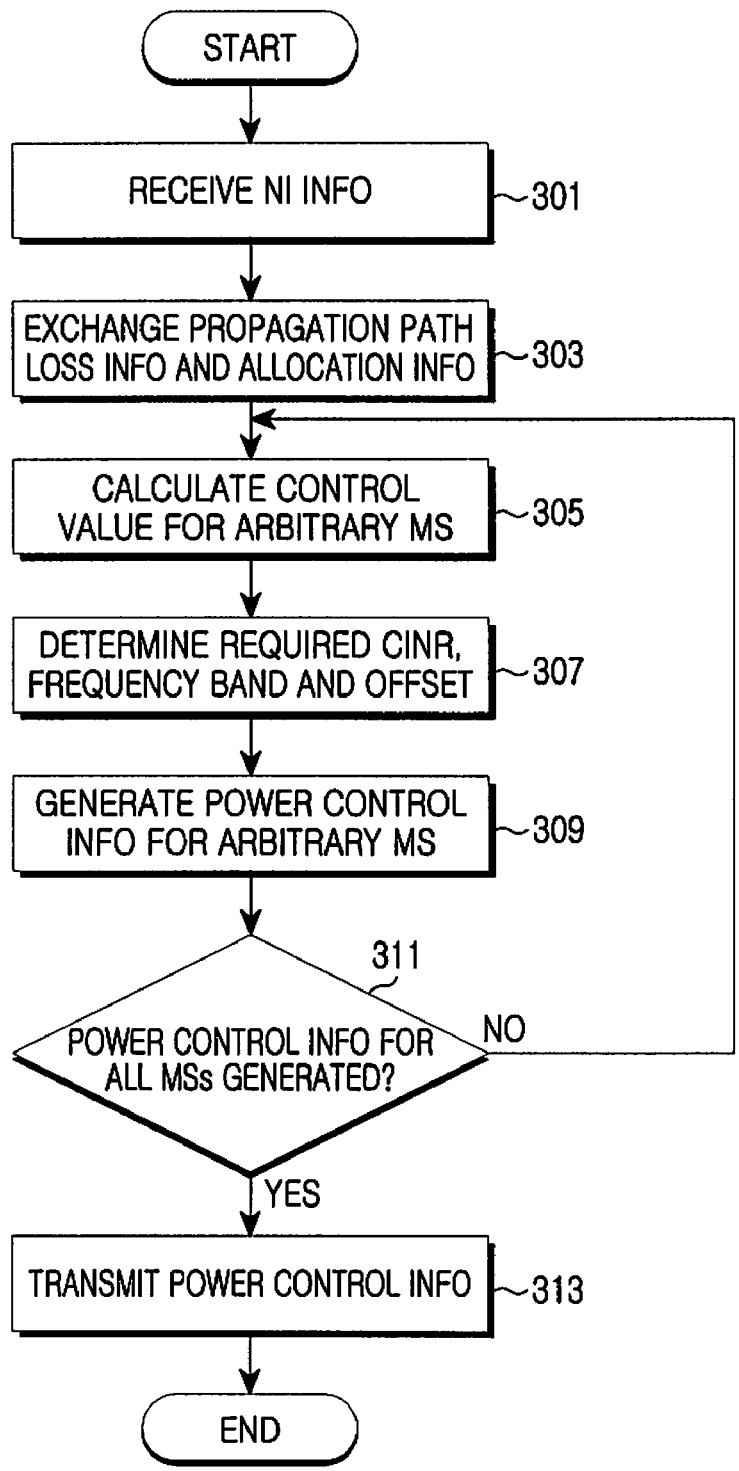
FIG. 3 illustrates a BS operation for power control in a communication system according to the present invention.

FIG. 3 illustrates a BS operation for power control in a communication system according to the present invention. Shown in FIG. 3 is a BS operation for when the BS receives propagation path loss information between neighboring BSs and MSs located in a serving cell from the neighboring BSs via a backbone network.

Referring to FIG. 3, in step 301, the BS receives NI information of a neighboring BS from neighboring BSs via the backbone network. In step 303, the BS receives propagation path loss information between MSs located in a serving cell and the neighboring BSs, and system and allocation information of the neighboring BSs, from the neighboring BSs via the backbone network as done when it receives the NI information of the neighboring BS. In addition, the BS generates NI information by measuring its own NI, and generates propagation path loss information by measuring a propagation path loss between the BS and MSs located in a neighboring cell. The BS operation of generating and transmitting/receiving the NI information and propagation path loss information, and the BS operation of transmitting/receiving the system information and allocation information have been described above.

In step 305, the BS calculates a control value for an arbitrary MS according to the NI information of the neighboring BSs, received in step 301, and the propagation path loss information received in step 303. That is, the BS calculates a control value for an arbitrary MS using Equation (6). Thereafter, in step 307, the BS determines required CINR $CINR_{req}$, frequency band $BW_m$ and offset $Offset_{BS}$ satisfying Equation (5) according to the control value calculated in step 305. In step 309, the BS generates power control information for controlling transmission power $P_{UL}$ of the MS as shown in Equation (5), according to the calculated control value, required CINR $CINR_{req}$, frequency band $BW_m$, and offset $Offset_{BS}$.

Figure 4:
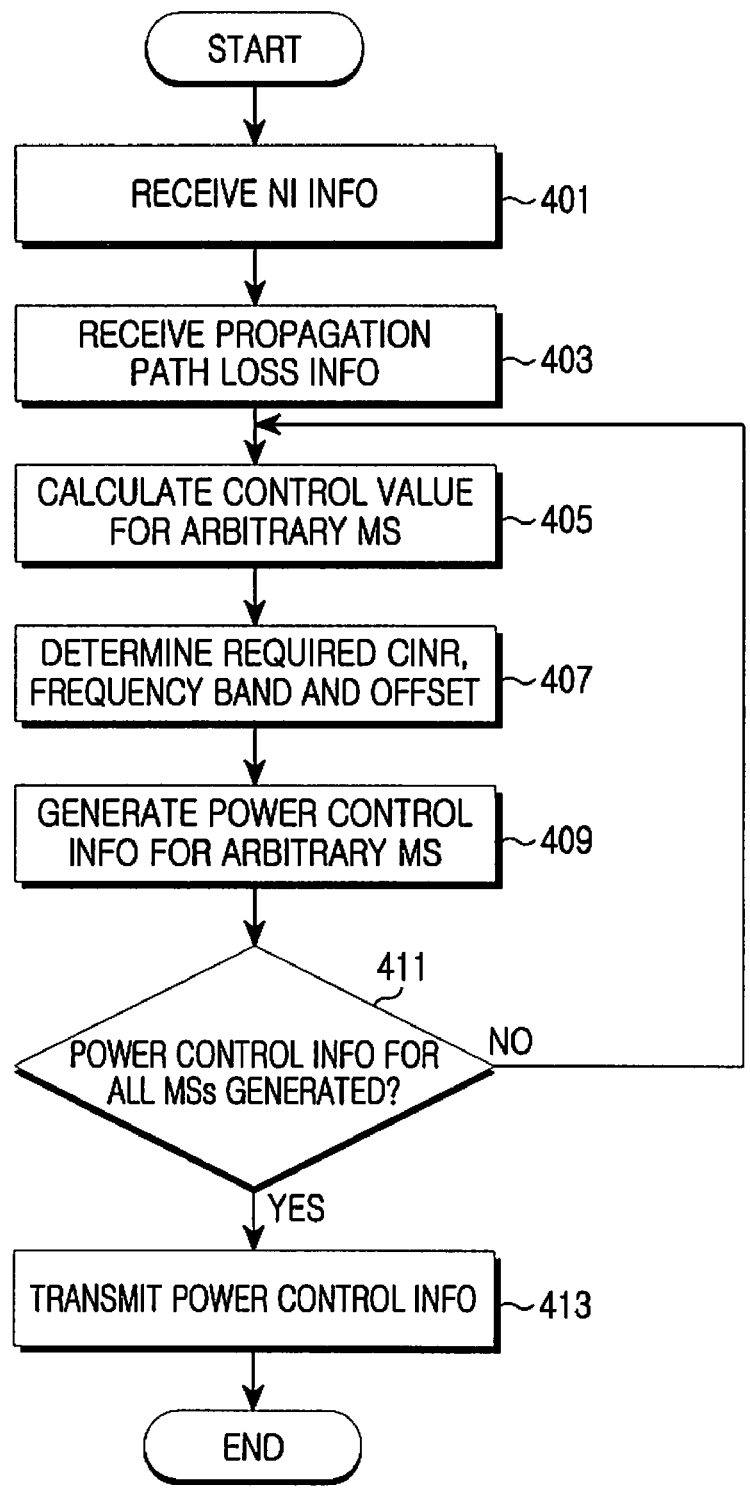
FIG. 4 illustrates a BS operation for power control in a communication system according to the present invention.

In step 311, the BS determines whether power control information for controlling transmission power $P_{UL}$ of all MSs located in the serving cell has been generated. If it is determined that the power control information for all MSs has been generated, the BS proceeds to step 313 where it transmits the generated power control information to the MSs. However, if it is determined in step 311 that the power control information for all MSs has not been generated, the BS returns to step 305 where it calculates a control value for an arbitrary MS and then repeats the foregoing operation to generate power control information. The BS generates power control information for all MSs by performing this process for all MSs. Although the description has been made herein as to the generation of the power control information satisfying Equation (5), by way of example, the BS can also generate control information such as MCS, resource allocation and offset information, and transmit the generated information to the MSs. FIG. 4 illustrates a BS operation for power control in a communication system according to the present invention. Shown in FIG. 4 is a BS operation for when the BS receives propagation path loss information between neighboring BSs and MSs located in a serving cell from the MSs located in the serving cell.

Referring to FIG. 4, in step 401, the BS receives NI information of a neighboring BS from neighboring BSs via a backbone network. In step 403, the BS receives propagation path loss information from MSs located in a serving cell. In addition, the BS generates NI information by measuring its own NI, and generates propagation path loss information by measuring a propagation path loss between the BS and MSs located in a neighboring cell after receiving system and allocation information of neighboring BSs via the backbone network as done when it receives the NI information of the neighboring BS. The BS operation of generating and transmitting/receiving the NI information and propagation path loss information, and the BS operation of transmitting/receiving the system information and allocation information have been described above.

Steps 405 to 413 are the same in operation as steps 305 to 313 described in FIG. 3. In step 405, the BS calculates a control value for an arbitrary MS according to the NI information of the neighboring BSs, received in step 401, and the propagation path loss information received in step 403. That is, the BS calculates a control value for an arbitrary MS using Equation (6). Thereafter, in step 407, the BS determines required CINR $CINR_{req}$, frequency band $BW_m$ and offset $Offset_{BS}$ satisfying Equation (5) according to the control value calculated in step 405. In step 409, the BS generates power control information for controlling transmission power $P_{UL}$ of the MS as shown in Equation (5), according to the calculated control value, required CINR $CINR_{req}$, frequency band $BW_m$, and offset $Offset_{BS}$.

In step 411, the BS determines whether power control information for controlling transmission power $P_{UL}$ of all MSs located in the serving cell has been generated. If it is determined that the power control information for all MSs has been generated, the BS proceeds to step 413 where it transmits the generated power control information to the MSs.

However, if it is determined in step 411 that the power control information for all MSs has not been generated, the BS returns to step 405 where it calculates a control value for an arbitrary MS and then repeats the foregoing operation to generate power control information. The BS generates power control information for all MSs by performing this process for all MSs. Although the description has been made herein as to the generation of the power control information satisfying Equation (5), by way of example, the BS can also generate control information such as MCS, resource allocation and offset information, and transmit the generated information to the MSs.

Figure 5:
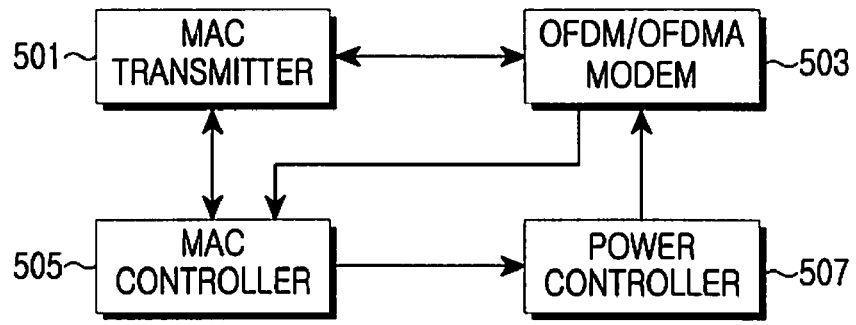
FIG. 5 illustrates a structure of an MS for receiving power control information from a BS in a communication system according to the present invention.

FIG. 5 illustrates a structure of an MS for receiving power control information from a BS in a communication system according to the present invention.

Referring to FIG. 5, the MS includes a MAC transmitter 501, an OFDM/OFDMA modem 503, a MAC controller 505 and a power controller 507.

The MAC transmitter 501 generates a MAC PDU by exchanging transmission data with an upper layer and the OFDM/OFDMA modem 503. That is, the MAC transmitter 501 receives data packets from the upper layer and control packets from the MAC controller 505, generates a MAC PDU using the received packets, and transmits the MAC PDU to the OFDM/OFDMA modem 503. The MAC transmitter 501 separates a payload part from the MAC PDU generated and transmitted by the OFDM/OFDMA modem 503, for an OFDM signal received from each MS, and transmits a data packet to the upper layer and a control packet to the MAC controller 505. In other words, the MAC transmitter 501 transmits, to the MAC controller 505, system information of a serving BS and neighboring BSs, and uplink/downlink allocation information for the MS, all of which are included in the control packet.

The OFDM/OFDMA modem 503 restores the MAC PDU transmitted by the serving BS using the OFDM signal received from the serving BS and the system and allocation information delivered from a control MAC, and transmits the restored data to the MAC transmitter 501. The OFDM/OFDMA modem 503 generates an OFDM signal from a MAC PDU using the MAC PDU received from the MAC transmitter 501 and the MAC controller 505, and system and allocation information transmitted from the control MAC, and then transmits the generated OFDM signal to the serving BS. The OFDM/OFDMA modem 503 measures a downlink propagation path loss between the MS and the neighboring BSs using the system and allocation information received from the serving BS, generates propagation path loss information according to the measurement result, and transmits the generated propagation path loss information to the MAC controller 505. The OFDM/OFDMA modem 503 can also measure CINR, SINR or RSSI other than the downlink propagation path loss between the MS and the neighboring BSs.

The MAC controller 505 receives the system information of the neighboring BSs, received from the serving BS, and uplink/downlink allocation information for the MS, received from the MAC transmitter 501, and manages the received information. The received system and allocation information of the neighboring BSs and the serving BS are used by the OFDM/OFDMA modem 503 to receive an OFDM signal from the serving BS, to generate propagation path loss information by measuring a propagation path loss between the MS and neighboring BSs, or to measure a reception CINR $CINR_{RX}$. After it receives from the MAC transmitter 501 the power control information received from the serving BS, the MAC controller 505 transmits the received power control information to the power controller 507. The MAC controller 505 generates a control packet including the propagation path loss information and the reception CINR $CINR_{RX}$ received from the OFDM/OFDMA modem 503, and then transmits the generated control packet to the MAC transmitter 501 to transmit it to the serving BS. The MS transmits the downlink propagation path loss information between the MS itself and the neighboring BSs, or CINR or SINR between the MS and the neighboring BSs to the serving BS, using a predetermined message, or a message for handover.

The power controller 507 transmits, to the OFDM/OFDMA modem 503, the transmission power determined by performing power control according to the power control information received from the MAC controller 505 using the open-loop power control scheme or the closed-loop power control scheme.

Figure 6:
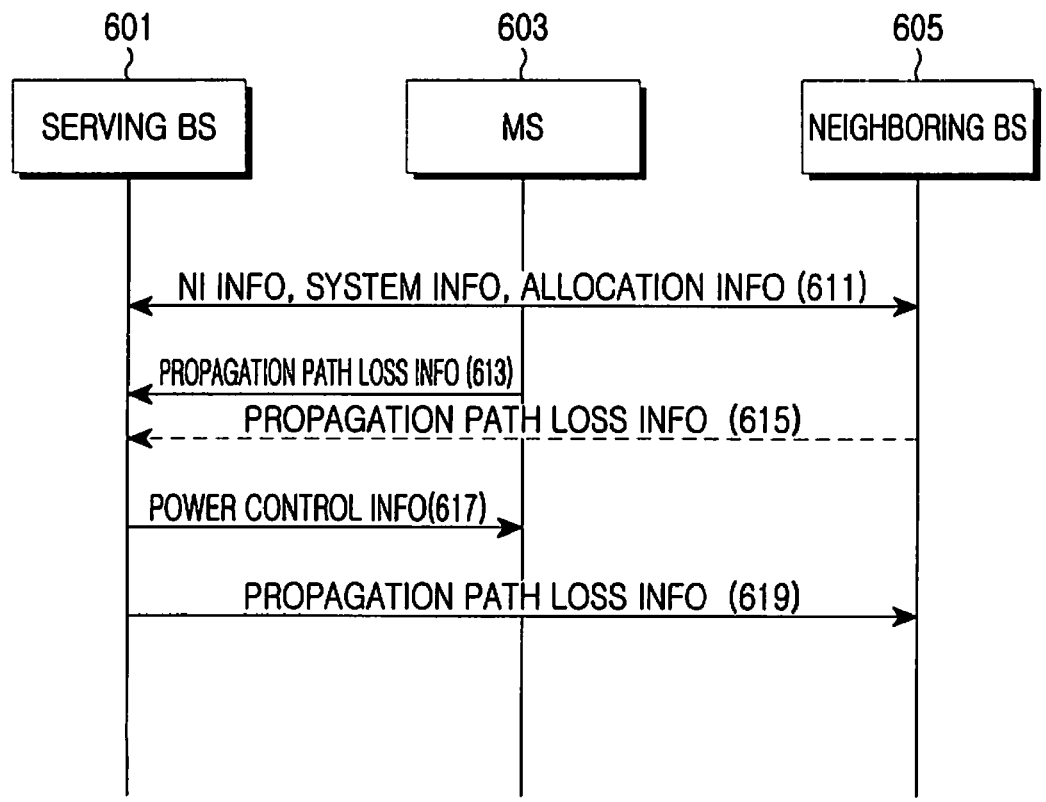
FIG. 6 illustrates a signaling diagram of a system for power control in a communication system according to the present invention.

FIG. 6 is a signaling diagram of a system for power control in a communication system according to the present invention.

Referring to FIG. 6, a serving BS 601 and a neighboring BS 605 exchange NI, system and allocation information in step 611. This exchange has been described above in detail.

Thereafter, the serving BS 601 receives propagation path loss information from an MS 603 located in the serving cell in step 613, or from the neighboring BS 605 in step 615. The serving BS 601 generates power control information of the MS 603 by performing the power control operation described in FIGS. 3 and 4, and then transmits the generated power control information to the MS 603 in step 617. Although the description has been made herein as to the generation of the power control information satisfying Equation (5), by way of example, the BS can also generate control information such as MCS, resource allocation and offset information, and transmit the generated information to the MSs. Thereafter, the serving BS 601 transmits propagation path loss information between the serving BS 601 and MSs located in the neighboring cell 605 to the neighboring BS 605 in step 619.

As is apparent from the foregoing description, according to the present invention, the BS in charge of a serving cell controls transmission power, MCS level and allocation resources of MSs located in the serving cell, and an offset from reference power according to noise and interference information received from neighboring BSs in charge of neighboring cells being adjacent to the serving cell, and channel information between the MSs and the neighboring BSs.

In addition, the BS reduces the number of control messages exchanged between the BS and the MSs by controlling the transmission power, MCS level and allocation resources of the MSs, thereby preventing a waste of resources. Further, the BS controls optimization of transmission power, MCS level and allocation resources for the MSs, thereby contributing to improvement of the system performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A control method in a communication system, comprising:
receiving, by a Base Station (BS), noise and interference information from at least one neighboring BS in charge of a neighboring cell being adjacent to a serving cell of the BS;
calculating a control value of Mobile Stations (MSs) located in the serving cell according to the received noise and interference information; and generating control information according to the calculated control value, and transmitting the generated control information to the MSs, wherein the calculation of the control value of MSs comprises calculating one of an increasing or decreasing value of at least one of a power offset, a Modulation and Coding Scheme (MCS) level, and an amount of allocated resources of the MSs, and wherein the calculation of the control value of the MSs comprises calculating, in a negative value, a control value of an MS having a high channel quality with the neighboring BSs among the MSs, when a noise and interference level of the neighboring BSs included in the noise and interference information is higher than a reference noise and interference level.

2. The control method of claim 1, wherein the calculation of the control value in the negative value comprises calculating, in a negative value, a control value of an MS causing noise and interference to a neighboring BS, which is higher in noise and interference level than other neighboring BSs, among the neighboring BSs.

3. The control method of claim 1, wherein an absolute value of the control value is proportional to an absolute value of a difference between the noise and interference level of the neighboring BSs and the reference noise and interference level.

4. The control method of claim 1, wherein an absolute value of the control value is inversely proportional to a propagation path loss of a link between the MS and a neighboring BS which is higher in noise and interference level than other neighboring BSs, among the neighboring BSs.

5. The control method of claim 1, wherein the calculation of the control value of the MSs comprises calculating, in a positive value, a control value of an MS having a low channel quality with the neighboring BSs among the MSs, when a noise and interference level of the neighboring BSs included in the noise and interference information is lower than a reference noise and interference level.

6. The control method of claim 5, wherein the calculation of the control value in the positive value comprises calculating, in a positive value, a control value of an MS contributing noise and interference to a neighboring BS, which is lower in noise and interference level than other neighboring BSs, among the neighboring BSs.

7. The control method of claim 5, wherein an absolute value of the control value is proportional to an absolute value of a difference between the noise and interference level of the neighboring BSs and the reference noise and interference level.

8. The control method of claim 5, wherein an absolute value of the control value is proportional to a propagation path loss of a link between the MS and a neighboring BS which is higher in noise and interference level than other neighboring BSs, among the neighboring BSs.

9. The control method of claim 1, wherein the calculation of the control value of the MSs comprises calculating, in a positive value, a control value of an MS having a low channel quality with the neighboring BSs among the MSs, when a noise and interference level of the neighboring BSs included in the noise and interference information is higher than a reference noise and interference level.

10. The control method of claim 9, wherein the calculation of the control value in the positive value comprises calculating, in a positive value, a control value of an MS contributing noise and interference to a neighboring BS, which is higher in noise and interference level than other neighboring BSs, among the neighboring BSs.

11. The control method of claim 9, wherein an absolute value of the control value is inversely proportional to an absolute value of a difference between the noise and interference level of the neighboring BSs and the reference noise and interference level.

12. The control method of claim 9, wherein an absolute value of the control value is proportional to a propagation path loss of a link between the MS and a neighboring BS which is higher in noise and interference level than other neighboring BSs, among the neighboring BSs.

13. The control method of claim 1, further comprising:
measuring noise and interference with the MSs located in the neighboring cells, generating noise and interference information of the BS according to the measurement result, and transmitting the generated noise and interference information to the neighboring BSs.

14. The control method of claim 13, wherein the measurement of noise and interference with the MSs comprises measuring a pilot strength of a signal transmitted by each of the MSs located in the neighboring cells.

15. The control method of claim 1, wherein the noise and interference information is transmitted and received between the BS and the neighboring BSs via a backbone network.

16. The control method of claim 1, wherein the calculation of the control value of MSs comprises receiving channel information between the MSs and the neighboring BSs from the MSs, and calculating a control value according to the received channel information and the received noise and interference information.

17. The control method of claim 16, wherein the channel information includes at least one of propagation path loss information, Received Signal Strength Indication (RSSI) information, Signal-to-Interference and Noise Ratio (SINR) information, and Carrier-to-Interference and Noise Ratio (CINR) information in a channel between the MSs and the neighboring BSs.

18. A control system in a communication system, comprising:
a Base Station (BS) for receiving noise and interference information from at least one neighboring BS in charge of a neighboring cell being adjacent to a serving cell of the BS, calculating a control value of Mobile Stations (MSs) located in the serving cell according to the received noise and interference information, generating control information according to the calculated control value, and transmitting the generated control information to the MSs, wherein the control value of MSs is an increasing or decreasing value of at least one of a power offset, a Modulation and Coding Scheme (MCS) level, and an amount of allocated resources of the MSs, and wherein the BS calculates, in a negative value, a control value of an MS having a high channel quality with the neighboring BSs among the MSs, when a noise and interference level of the neighboring BSs included in the noise and interference information is higher than a reference noise and interference level.

19. The control system of claim 18, wherein the BS calculates, in a negative value, a control value of an MS contributing noise and interference to a neighboring BS, which is higher in noise and interference level than other neighboring BSs, among the neighboring BSs.

20. The control system of claim 18, wherein an absolute value of the control value is proportional to an absolute value of a difference between the noise and interference level of the neighboring BSs and the reference noise and interference level.

21. The control system of claim 18, wherein an absolute value of the control value is inversely proportional to a propagation path loss of a link between the MS and a neighboring BS which is higher in noise and interference level than other neighboring BSs, among the neighboring BSs.

22. The control system of claim 18, wherein the BS calculates, in a positive value, a control value of an MS having a low channel quality with the neighboring BSs among the MSs, when a noise and interference level of the neighboring BSs included in the noise and interference information is lower than a reference noise and interference level.

23. The control system of claim 22, wherein the BS calculates, in a positive value, a control value of an MS contributing noise and interference to a neighboring BS, which is lower in noise and interference level than other neighboring BSs, among the neighboring BSs.

24. The control system of claim 22, wherein an absolute value of the control value is proportional to an absolute value of a difference between the noise and interference level of the neighboring BSs and the reference noise and interference level.

25. The control system of claim 22, wherein an absolute value of the control value is proportional to a propagation path loss of a link between the MS and a neighboring BS which is higher in noise and interference level than other neighboring BSs, among the neighboring BSs.

26. The control system of claim 18, wherein the BS calculates, in a positive value, a control value of an MS having a low channel quality with the neighboring BSs among the MSs, when a noise and interference level of the neighboring BSs included in the noise and interference information is higher than a reference noise and interference level.

27. The control system of claim 26, wherein the BS calculates, in a positive value, a control value of an MS contributing noise and interference to a neighboring BS, which is higher in noise and interference level than other neighboring BSs, among the neighboring BSs.

28. The control system of claim 26, wherein an absolute value of the control value is inversely proportional to an absolute value of a difference between the noise and interference level of the neighboring BSs and the reference noise and interference level.

29. The control system of claim 26, wherein an absolute value of the control value is proportional to a propagation path loss of a link between the MS and a neighboring BS which is higher in noise and interference level than other neighboring BSs, among the neighboring BSs.

30. The control system of claim 18, wherein the BS measures noise and interference with the MSs located in the neighboring cells, generates noise and interference information of the BS according to measurement result, and transmits the generated noise and interference information to the neighboring BSs.

31. The control system of claim 30, wherein the BS measures pilot strength of a signal transmitted by each of the MSs located in the neighboring cells to measure the noise and interference with the MSs.

32. The control system of claim 18, wherein the noise and interference information is transmitted and received between the BS and the neighboring BSs via a backbone network.

33. The control system of claim 18, wherein the BS receives channel information between the MSs and the neighboring BSs from the MSs, and calculates a control value according to the received channel information and the received noise and interference information.

34. The control system of claim 33, wherein the channel information includes at least one of propagation path loss information, Received Signal Strength Indication (RSSI) information, Signal-to-Interference and Noise Ratio (SINR) information, and Carrier-to-Interference and Noise Ratio (CINR) information in a channel between the MSs and the neighboring BSs.

\* \* \* \* \*